(12) United States Patent
Pierobon

(10) Patent No.: US 11,284,668 B2
(45) Date of Patent: Mar. 29, 2022

(54) WATERPROOF AND VAPOR-PERMEABLE SHOE AND MANUFACTURING METHOD THEREOF

(71) Applicant: CALZATURIFICIO S.C.A.R.P.A. S.P.A., Asolo (IT)

(72) Inventor: Roberto Pierobon, Montebelluna (IT)

(73) Assignee: CALZATURIFICIO S.C.A.R.P.A. S.P.A., Asolo (IT)

( * ) Notice: Subject to any disclaimer, the term of this patent is extended or adjusted under 35 U.S.C. 154(b) by 0 days.

(21) Appl. No.: 16/598,888

(22) Filed: Oct. 10, 2019

(65) Prior Publication Data

US 2020/0037697 A1 Feb. 6, 2020

Related U.S. Application Data

(63) Continuation of application No. 14/769,569, filed as application No. PCT/IB2014/059244 on Feb. 25, 2014, now Pat. No. 10,441,024.

(30) Foreign Application Priority Data

Feb. 25, 2013 (IT) .......................... TV2013A000023

(51) Int. Cl.
| | | |
|---|---|---|
| *A43B 7/12* | (2006.01) | |
| *A43B 13/38* | (2006.01) | |
| *A43B 17/10* | (2006.01) | |
| *A43B 9/12* | (2006.01) | |

(Continued)

(52) U.S. Cl.
CPC ............ *A43B 7/125* (2013.01); *A43B 13/386* (2013.01); *A43B 17/107* (2013.01); *A43B 9/08* (2013.01); *A43B 9/12* (2013.01); *A43B 13/38* (2013.01); *B29D 35/14* (2013.01); *B29D 35/146* (2013.01)

(58) Field of Classification Search
CPC .. A43B 7/125; A43B 9/08; A43B 1/10; A43B 3/16; A43B 5/001; A43B 7/06; A43B 7/08; A43B 7/087; A43B 7/12; A43B 9/12; A43B 23/002; A43B 23/0255; A43B 23/07; A43B 13/38; A43B 13/386; A43B 17/107; A43B 23/022
USPC .............. 36/16, 17 A, 19 A, 46.5; 12/142 A, 12/142 T, 145, 146 C
See application file for complete search history.

(56) References Cited

U.S. PATENT DOCUMENTS

| | | |
|---|---|---|
| 1,408,043 A | 2/1922 | Taylor |
| 2,036,406 A | 4/1936 | Goddu |
| 2,067,845 A | 1/1937 | Casanova |

(Continued)

FOREIGN PATENT DOCUMENTS

WO 01/82731 A2 11/2001

*Primary Examiner* — Heather Mangine
(74) *Attorney, Agent, or Firm* — Greer, Burns & Crain, Ltd

(57) ABSTRACT

A method for manufacturing a waterproof and vapor-permeable shoe comprising the steps of providing an upper and a lining comprising at least one functional layer of vapor-permeable and waterproof material, providing an insole comprising a functional support sheet of vapor-permeable and waterproof material, coupling the peripheral edge of the functional layer of the lining to the peripheral edge of the functional sheet of the insole by way of a sealing waterproof adhesive so as to shape a sock of vapor-permeable and waterproof material, couple the upper to the outer surface of the lining by way of a vapor-permeable adhesive; and couple a sole to the upper and/or to the lining and/or to the insole.

9 Claims, 6 Drawing Sheets

(51) Int. Cl.
   *B29D 35/14* (2010.01)
   *A43B 9/08* (2006.01)

(56) References Cited

U.S. PATENT DOCUMENTS

| | | | |
|---|---|---|---|
| 2,316,363 | A | 4/1943 | Quinn et al. |
| 2,496,782 | A | 2/1950 | Engel |
| 3,525,110 | A | 8/1970 | Batchelder et al. |
| 4,905,336 | A | 3/1990 | Sanderson et al. |
| 4,907,350 | A | 3/1990 | Chilewich et al. |
| 4,930,175 | A | 6/1990 | Chen |
| 5,285,546 | A | 2/1994 | Haimerl |
| 5,685,091 | A | 11/1997 | Yalamanchili |
| 5,737,857 | A | 4/1998 | Aumann |
| 5,746,012 | A | 5/1998 | Caletti et al. |
| 6,389,711 | B1 | 5/2002 | Polegato |
| 6,408,541 | B1 | 6/2002 | Moretti |
| 7,316,083 | B2 | 1/2008 | Labonté |
| 8,307,483 | B2 | 11/2012 | Haimerl |
| 8,640,291 | B2 | 2/2014 | Fleming et al. |
| 9,510,642 | B2 | 12/2016 | Polegato Moretti |
| 9,763,492 | B2 | 9/2017 | Polegato Moretti |
| 10,441,024 | B2 * | 10/2019 | Pierobon .......... A43B 7/125 |
| 2002/0157278 | A1 | 10/2002 | Moretti |
| 2005/0138845 | A1 | 6/2005 | Haimerl |
| 2005/0193505 | A1 | 9/2005 | Steidle |
| 2005/0210708 | A1 * | 9/2005 | Chen .................... A43B 7/125 36/55 |
| 2008/0127519 | A1 | 6/2008 | Byrne et al. |
| 2008/0216358 | A1 | 9/2008 | Polegato Moretti |
| 2009/0158621 | A1 | 6/2009 | Yamamoto |
| 2009/0188134 | A1 | 7/2009 | Polegato Moretti |
| 2009/0199438 | A1 | 8/2009 | Polegato Moretti |
| 2010/0011624 | A1 | 1/2010 | Polegato Moretti |
| 2010/0050480 | A1 | 3/2010 | Polegato Moretti |
| 2010/0115792 | A1 | 5/2010 | Muller |
| 2011/0252667 | A1 | 10/2011 | Polegato Moretti |
| 2012/0030885 | A1 | 2/2012 | Moretti |
| 2012/0055042 | A1 | 3/2012 | Polegato Moretti |
| 2012/0151806 | A1 | 6/2012 | Polegato Moretti |
| 2012/0210604 | A1 | 8/2012 | Polegato Moretti |
| 2013/0232826 | A1 | 9/2013 | Bier et al. |
| 2013/0239442 | A1 * | 9/2013 | Plegato Moretti ...... A43B 7/125 36/3 A |
| 2014/0237853 | A1 | 8/2014 | Fisher et al. |
| 2015/0342296 | A1 | 12/2015 | Skaja et al. |
| 2015/0374064 | A1 * | 12/2015 | Pierobon ............... A43B 7/125 36/3 R |
| 2016/0136910 | A1 | 5/2016 | Krajcir |
| 2020/0037698 | A1 * | 2/2020 | Pierobon ................. A43B 9/08 |

* cited by examiner

WATERPROOF AND VAPOR-PERMEABLE SHOE AND MANUFACTURING METHOD THEREOF

RELATED APPLICATION

This application is a continuation application of and claims 35 U.S.C. 120 priority to U.S. patent application Ser. No. 14/769,569 filed Aug. 21, 2015, which is incorporated by reference, which application is a U.S. National Stage under 35 U.S.C. § 371 of International Application No. PCT/IB2014/059244, filed Feb. 25, 2014, which is incorporated by reference.

TECHNICAL FIELD

The present invention relates to a waterproof and vapor-permeable shoe and to the related manufacturing method.

BACKGROUND ART

Several methods are known for manufacturing waterproof and vapor-permeable shoes, in which the shoe essentially comprises an upper, a multilayer lining which is arranged inside the upper and is provided with a vapor-permeable and waterproof membrane which, in use, is interposed between the foot and the upper, and a sole glued to the upper. In particular, the vapor-permeable and waterproof membrane called "Gore-tex" is known, consisting of an extremely thin film of Teflon® E-PTFE (polytetrafluoroethylene) coupled to supporting/protective layers.

One of the aforesaid methods is described in international Patent Application WO2008/119683 and essentially involves preparing an open, shaped upper, i.e. so as to be able to be arranged and developed on one plane, arranging a punctiform adhesive between the upper and the membrane, arranging a waterproof and vapor-permeable membrane on the inner part of the upper, preparing shapes having two flat and parallel lateral sides associated with the model of the shoe to be manufactured, securing the membrane to the upper previously arranged about the shape with the outer surface in contact therewith, folding back the assembly comprising membrane and upper and couple it to an insole, and finally coupling the sole to the insole and to the upper.

Although the above-described method on the one hand has decreased the operating complexity of the preceding manufacturing methods, thus reducing costs and times and guaranteeing at the same time both satisfactory waterproofness and vapor-permeableness of the shoe and the elimination of the formation of water stagnation between upper and membrane, on the other hand it does not completely meet the current need to further simplify the procedure for manufacturing the shoe so as to contain/reduce the manufacturing prices thereof.

Indeed, there is a need to manufacture a vapor-permeable and waterproof shoe which in particular prevents water from penetrating and stagnating between upper and membrane, without shaking the current "traditional" lines/procedures for manufacturing shoes, that is, without requiring the use of additional machines and/or components with respect to those already generally used/present in traditional shoe manufacturing companies.

In particular, the above-described method involves using specific flat shapes for each shoe model to be manufactured and modifying/replacing the same on the basis of the shoe models. Obviously this requirement/restriction does not satisfy the above-mentioned need because it affects the complexity and therefore manufacturing times of the waterproof and vapor-permeable shoe in a considerable manner, thus leading to an increase in costs.

Patent Application EP 2 238 859 A1 describes a method for manufacturing a waterproof and vapor-permeable shoe in which it is envisaged to: secure a first gasket of vapor-permeable material having a holed vapor-permeable portion to a vapor-permeable assembly insole, connect the assembly margins of an assembly provided with an upper and a lining, provided with a waterproof and vapor-permeable membrane, to the first gasket according to the construction known as AGO lasting such as to obtain the assembly of the shoe, assemble a second gasket straddling the assembly margins of the first gasket so as to seal them and finally, assemble the sole to the assembly so as to ensure that the material of the sole adheres to the second gasket. The method described in Patent Application EP 2 238 859 A1 has the drawback of requiring the application of two gaskets with obvious consequences in terms of increased manufacturing times and costs of the shoe. The use of the second gasket is indeed essential because folds which are not completely sealed by the first gasket are formed on the upper during the assembly step, at the toe and/or heel. To this end, Patent EP 2 238 859 teaches to arrange a second gasket straddling the assembly margins of the first gasket so as to prevent the infiltration of water through the folds in the upper.

Patent Application WO2008/116772 describes a method for manufacturing a waterproof and vapor-permeable shoe in which it is envisaged to sew the border of the upper to a sealing band and to couple the ribbon-shaped sealing band and the edge of a functional element of the upper to a peripheral margin of the insole. The employment of the sealing band is complex, inconvenient, lengthens manufacturing times and increases costs for executing the method.

The Applicant has carried out in-depth research to identify a solution that specifically allows achieving the aim of providing a method for manufacturing a vapor-permeable and waterproof shoe, that is simple and affordable.

DISCLOSURE OF INVENTION

The object of the present invention is therefore to provide a solution which allows the above objectives to be reached.

This object is reached by the present invention because it relates to a method for manufacturing a waterproof and vapor-permeable shoe and to a shoe as defined in the appended claims.

BRIEF DESCRIPTION OF THE DRAWINGS

The present invention will now be described with reference to the accompanying drawings, which illustrate a non-limiting embodiment thereof, in which.

BEST MODE FOR CARRYING OUT THE INVENTION

The present invention will now be described in detail with reference to the accompanying figures to allow a skilled person to make and use it. Various modifications to the embodiments described will be immediately apparent to skilled persons and the generic principles described may be applied to other embodiments and applications without departing from the scope of protection of the present invention, as defined in the appended claims. Therefore, the present invention is not be considered limited to the embodiments described and illustrated, rather is to be given the broadest scope of protection conforming with the principles and characteristics herein described and claimed.

Figure 1:
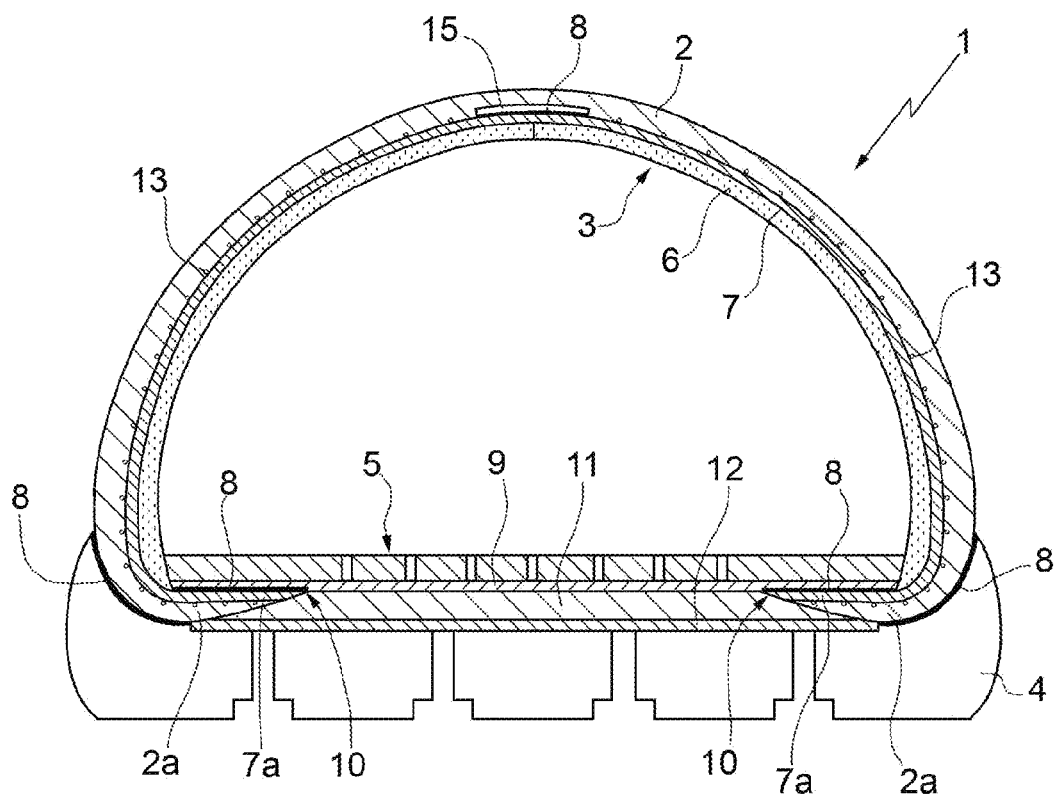
FIGS. 1 and 2 schematically show a cross section and a longitudinal section, respectively, with parts removed for clarity, of a first embodiment of the shoe obtained by way of the method according to the present invention.
Figure 2:
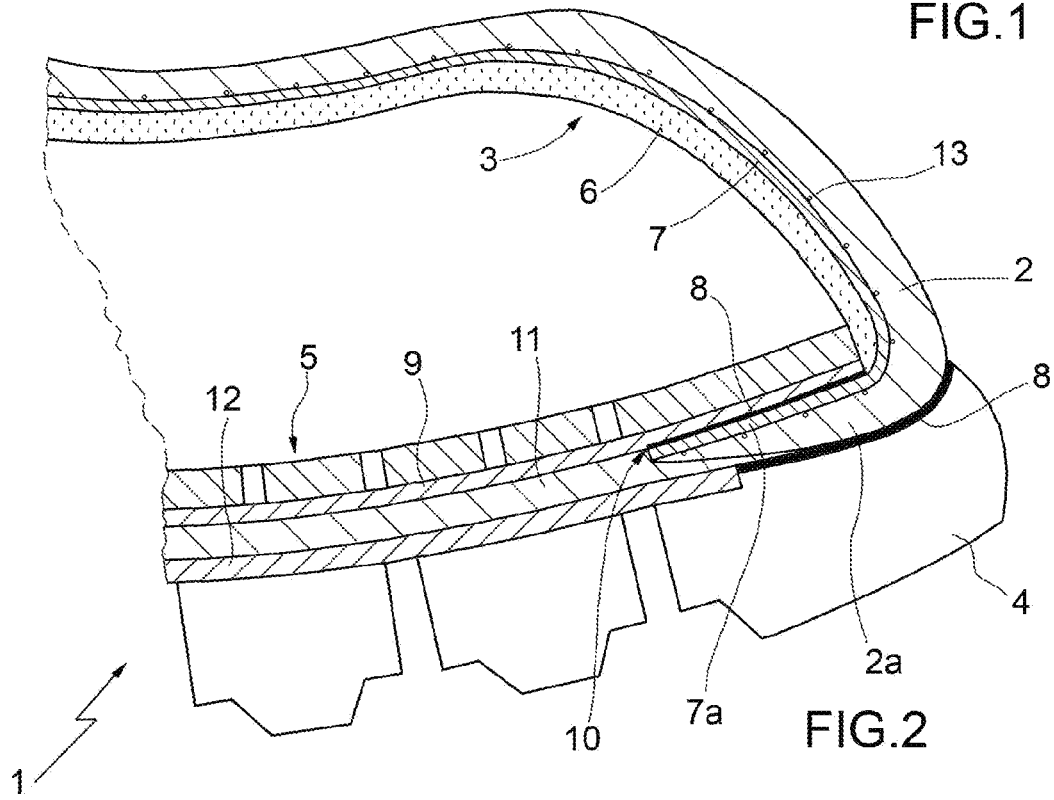

With reference to FIGS. 1 and 2, numeral 1 indicates a first embodiment of a waterproof and vapor-permeable shoe as a whole, manufactured by way of the method provided according to the present invention described in detail below.

Shoe 1 comprises an outer upper 2 shaped so as to surround, in use, the foot (not shown), a multilayer lining 3 coupled to the inner surface of upper 2, a sole 4 coupled inferiorly to upper 2, and an insole 5 placed inside shoe 1 resting on sole 4.

Lining 3 comprises a covering layer 6 of vapor-permeable material, for example fabric designed, in use, to be arranged in contact with the foot inside shoe 1, and a functional layer 7 of vapor-permeable and waterproof material, which is arranged between upper 2 and the covering layer 6 and is shaped so as to surround/wrap around the foot arranged in shoe 1.

The covering layer 6 is shaped so as to have the lower peripheral edge thereof substantially in contact with/against the peripheral edge of insole 5, while the functional layer 7 has a lower peripheral flap 7*a*, which protrudes from/extends beyond the peripheral edge of the covering layer 6 and is coupled stably to a functional support sheet 9 preferably of insole 5 made of vapor-permeable and waterproof material, so as to conveniently form, with the latter, inside shoe 1, a sock or vapor-permeable and waterproof bag, which in use surrounds the foot on all sides.

With regards to upper 2, it has a lower peripheral flap 2*a* which protrudes from/extends beyond the covering layer 6 and is fixed stably on the outer surface of the lower peripheral flap 7*a* opposite to the functional support sheet 9.

In the embodiment shown in FIGS. 1 and 2, the lower peripheral flap 7*a* of the functional layer 7 is folded back internally (i.e. towards the middle part of the shoe) together with flap 2*a* of upper 2, so as to be arranged beneath the functional support sheet 9 and is attached to the latter, by way of an adhesive material 8, so as to form a peripheral waterproof seal 10. The adhesive material 8 preferably covers the upper surface of flap 7*a* facing sheet 9 and may preferably comprise a hydrolysis-resistant sealing adhesive, such as for example a polyurethane-based adhesive with activators which prevent the dissolution thereof once reticulated, or an/a artificial/natural latex-based or rubber-based adhesive, or any other similar waterproof sealing adhesive.

According to a preferred embodiment, the functional layer 7 and/or the functional support sheet 9 may be formed by one or more waterproof and vapor-permeable material films coupled reciprocally, and may be sized so as to each have a predetermined thickness which varies on the basis of the type of shoe to be manufactured. In detail, the thickness of the functional layer 7 and/or of the functional support sheet 9 may be conveniently between about 20 microns and about 800 microns.

According to a preferred embodiment, the functional layer 7 and/or the functional support sheet 9 may each comprise one or more Teflon® E-PTFE films coupled to one or more films and/or protective layers of porous polyurethane and/or to one or more films and/or protective layers of polyester such as to form a multilayer structure.

According to a possible embodiment, the functional layer 7 and/or the functional support sheet 9 comprise a single layer of extruded E-PTFE of the thickness desired and made to be vapor-permeable with a specific known unplaiting operation.

It is understood that the functional layer 7 and/or the functional support sheet 9 could comprise any film/layer of waterproof and vapor-permeable material of known type.

According to a preferred embodiment, the functional support sheet 9 is integrated within/comprised in insole 5. Conveniently, the functional support sheet 9 may correspond to a lower layer of insole 5 provided in turn with at least one upper vapor-permeable layer, for example a perforated layer. Nevertheless, it is understood that according to a different embodiment, the functional support sheet 9 may comprise an independent layer separable from the body of insole 5, and be positioned beneath it.

With reference to FIGS. 1 and 2, the free bottom surface of the functional support sheet 9 and the bottom surfaces of flaps 2*a* and 7*a* folded back internally are covered by a filler layer 11, which is shaped and dimensioned so as to fill the middle layer between the flaps 2*a* and 7*a* so as to conveniently form a flat layer to couple with the underlying sole 4. The filler layer 11 may comprise a vapor-permeable material, such as for example felt or any similar material.

With regards to sole 4, it has a vapor-permeable structure. In the embodiment illustrated, sole 4 is made of waterproof material, is perforated and the outer peripheral edge thereof is coupled locally to upper 2 at the folded flap 2*a* thereof, by way of the adhesive material 8.

Preferably, but not necessarily, shoe 1 further comprises a protective insert 12 of vapor-permeable material, which is interposed between the upper perforated surface of sole 4 and the filler layer 11 and is structured to prevent contact between the functional layer 7 and any foreign bodies, for example small pebbles crossing through the holes of sole 4. The protective insert 12 may be made by way of a material having a reticular, or mesh, or porous structure, such as for example sintered or open cell expanded rubber.

With reference to FIGS. 3-8, the method is described below for manufacturing the shoe shown in FIGS. 1, 2, assuming that the manufacturing technique used is based on the so-called "AGO" lasting or "Cemented" technique, and that the functional layer 7 of vapor-permeable and waterproof material is integrated within insole 5.

Figure 3:
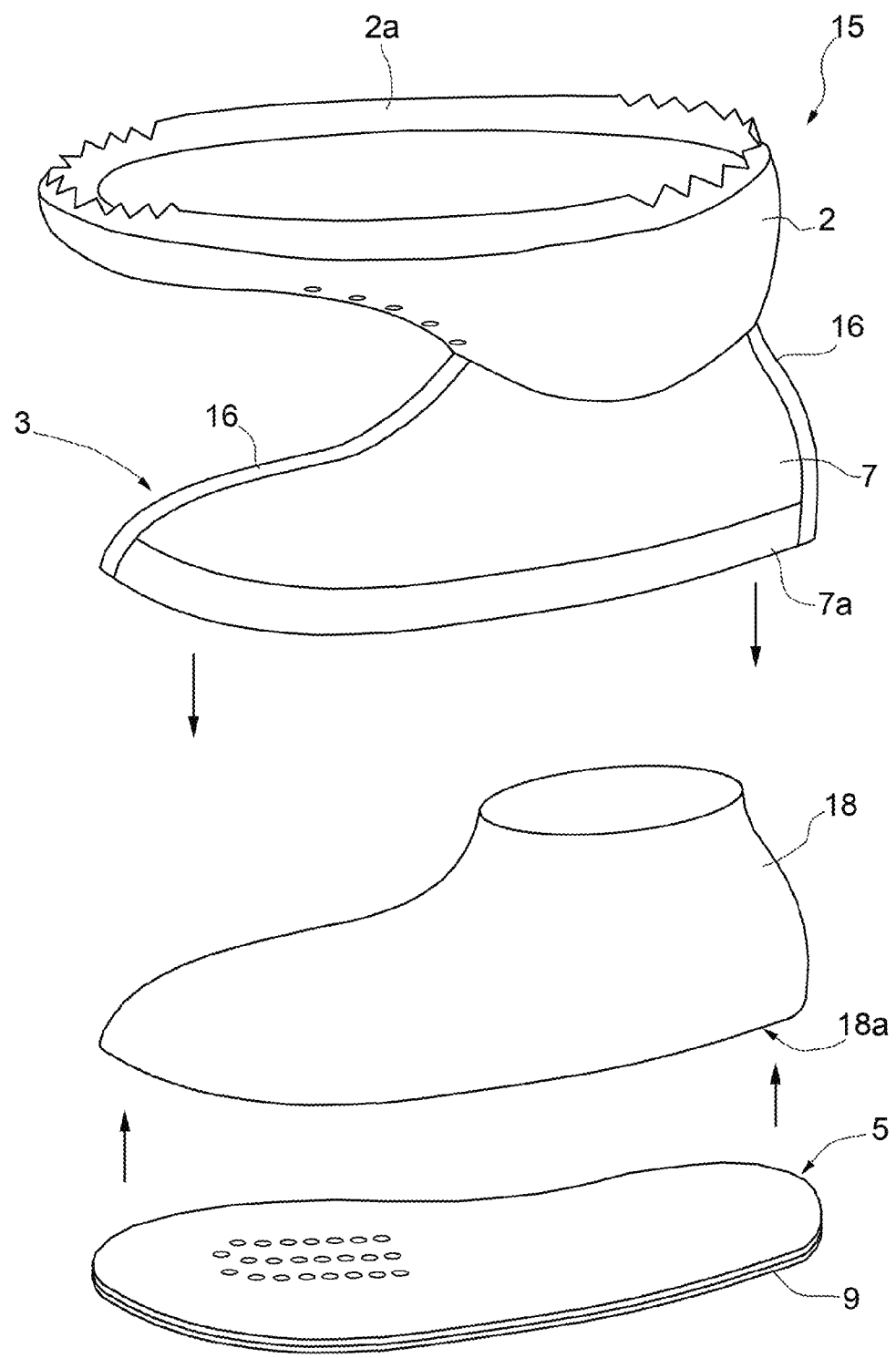
FIGS. 3-8 are just as many schematic views of the operating steps of the method for manufacturing the shoe shown in FIGS. 1 and 2; while FIGS. 9-12 schematically show the cross sections of just as many embodiment variants of the shoe shown in FIGS. 1 and 2.
Figure 4:
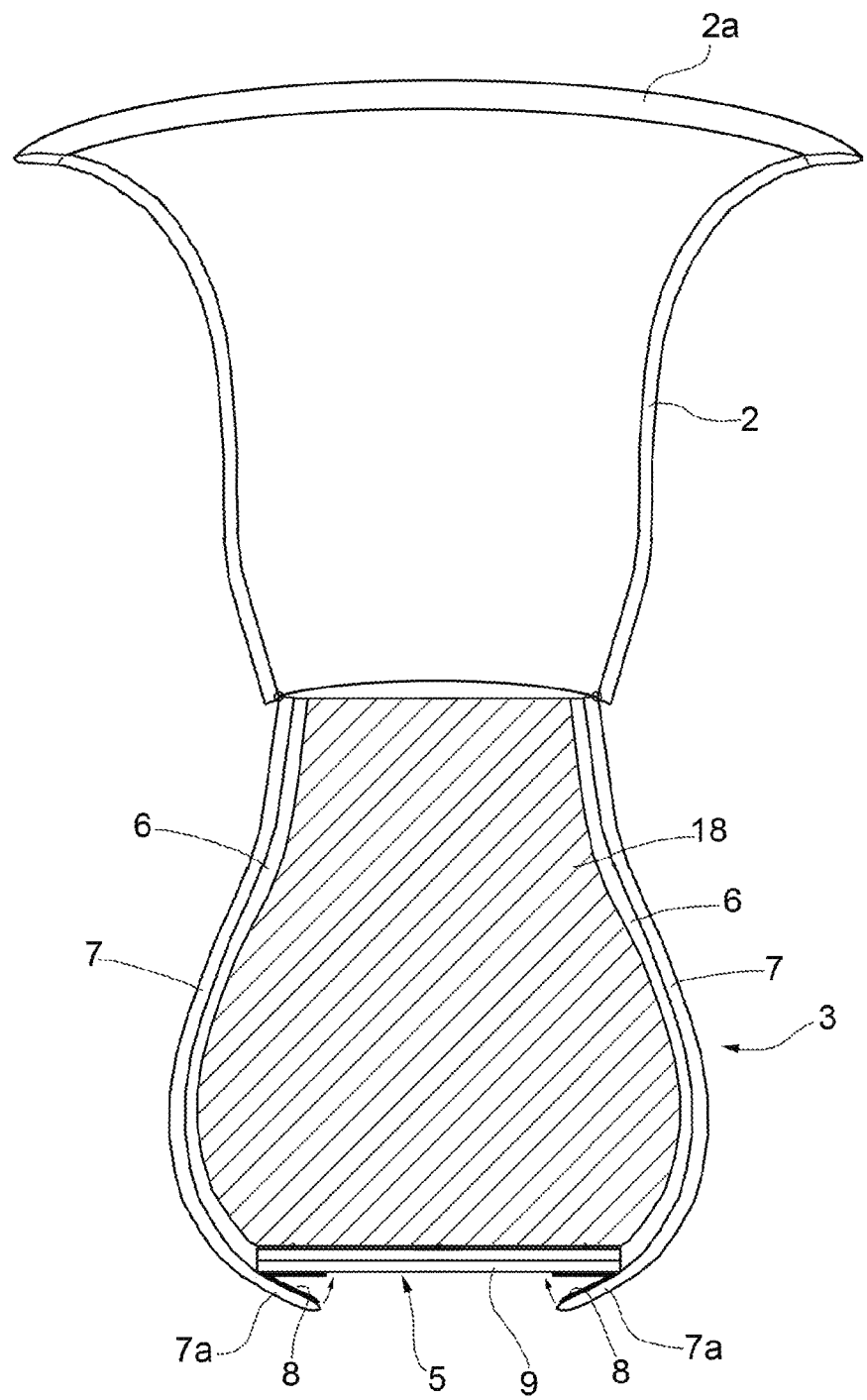

With reference to FIG. 3, the method comprises the step of providing a three-dimensional semi-finished piece or assembly 15 comprising the preassembled lining 3, that is closed laterally and open superiorly and inferiorly, and connected at the upper peripheral edge (which in use, surrounds the instep of the foot) to the preassembled upper 2, which is in turn folded back/overturned so as to be extracted from lining 3 and the inner surface thereof is folded back outwards. Preferably, the preassembled lining 3 may comprise at least a portion of multilayer lining folded back and connected (for example sewn or glued) at the matching/overlapping ends (preferably at the toe and/or the heel). Preferably, strips/bands 16 (FIGS. 1 and 3) may be applied above each junction/seam end of the portion of lining 3, by way of the adhesive material 8, so as to locally waterproof the holes formed in lining 3 when the ends are sewn.

Figure 5:
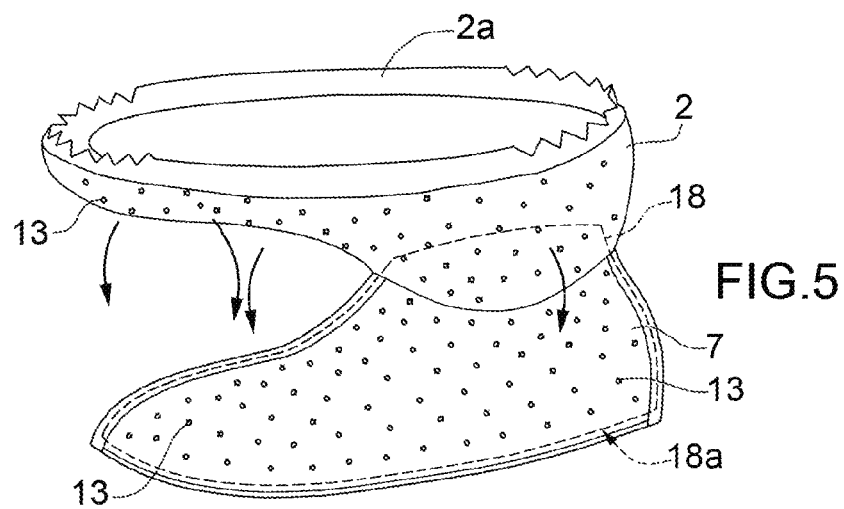

The method further comprises the steps of: providing a three-dimensional shape 18 (last), which traces the converse shape of a foot, temporarily keeping insole 5 with the upper surface (opposite to the functional sheet 9) adherent to plant 18*a* of shape 18 (FIG. 4) for example by way of two dots of glue, fitting lining 3 of assembly 15 on shape 18 to ensure that flap 7*a* protrudes overhangingly (downwards in the example shown in FIG. 4) past the peripheral edge of insole 5, bending/folding flap 7*a* towards the bottom surface of the functional sheet 9 along the peripheral edge of the latter, and coupling it thereto by means of gluing (FIG. 5).

In particular, flap 7*a* is folded internally to be arranged against the bottom surface of the functional sheet 9 and is glued thereto by means of the adhesive material 8 described above.

The adhesive material 8 may be distributed/spread over the entire upper surface of flap 7*a* and/or on the bottom contact surface of the functional sheet 9 so as to form, when flap 7*a* is arranged resting and glued on the functional sheet 9, the waterproof seal 10 which waterproofs the sock at the junction line between the functional layer 7 and the functional sheet 9. Flap 7*a* may be glued to the functional sheet 9 preferably by way of hot pressing (not shown) executed locally at the peripheral edge of insole 5. According to a different embodiment, it is understood that flap 7*a* could be secured to the functional sheet 9 by means of a soldering and/or melting operation (with high frequency techniques) or any similar securing system.

Figure 6:
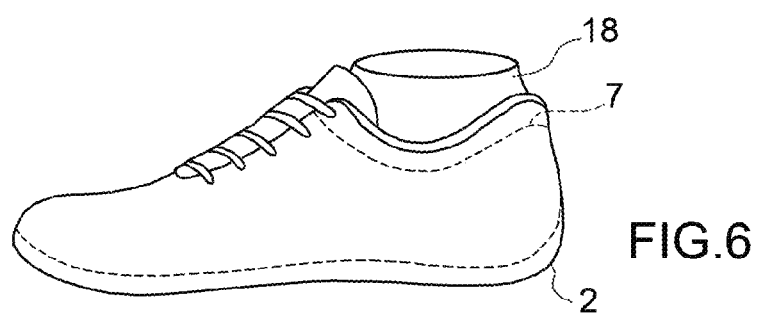

The method further comprises the step of folding back/overturning upper 2 so as to fit it above lining 3 previously assembled on shape 18, to ensure the inner surface thereof adheres to the outer surface of lining 3, and simultaneously folding flap 2*a* of upper 2 internally so as to arrange it substantially above the outer surface of the underlying flap 7*a* folded back (FIGS. 5 and 6).

Preferably, before folding flap 2*a* of upper 2, the method may involve the step of thinning flap 2*a* along the outer perimeter thereof to obtain a predetermined minimum thickness such as to prevent the formation of pleats or folds in flap 2*a* when it is applied above flap 7*a*. Preferably, flap 2*a* is thinned so as to progressively reduce the thickness thereof towards the outer edge.

The Applicant has found that a significant reduction is obtained in the formation of pleats or folds by suitably thinning flap 2*a* of upper 2 and using a flap 7*a* with a greater thickness than the thickness of flap 2*a*. In particular, flap 2*a* is thinned so that the thickness thereof towards the outer perimeter thereof is approximately 0.1 millimeters. Preferably, the thinning is gradual thus leaving the complete thickness along the perimeter of the shape and gradually reducing the thickness as the outer edge of flap 2*a* is reached.

Flap 2*a* of upper 2 may further be alternatively or additionally scalloped, that is having V notching at the portions associable with the toe and heel of shoe 1 so as to reduce the formation of folds and/or pleats and further promote the operation of gluing flap 2*a* to flap 7*a*.

The method further involves gluing flap 2*a* to flap 7*a*, for example, by way of the adhesive material 8, and of gluing the outer surface of the functional layer 7 to the inner surface of upper 10 by means of an adhesive 13, preferably applied discontinuously, for example by way of dotted distribution, so as to ensure transpiration by way of the functional layer 7 and upper 2. Adhesive 13 may be applied on at least one of the contact surfaces of upper 2 and of the functional layer and may preferably, but not necessarily, comprise a heat-reactive polyurethane adhesive.

The superficial punctiform (dots of adhesive/glue) distribution of adhesive 13 may be conveniently performed on the contact faces of upper 2 and/or of lining 3 so as to ensure reciprocal securing and lining/upper vapor-permeableness.

Obviously, the dotted distribution of the vapor-permeable adhesive 13 may be conveniently avoided/eliminated if at least one of the contract surfaces between lining 3 and upper 2 is coated with a reticular thermo-adhesive film (FIGS. 5 and 6).

Figure 7:
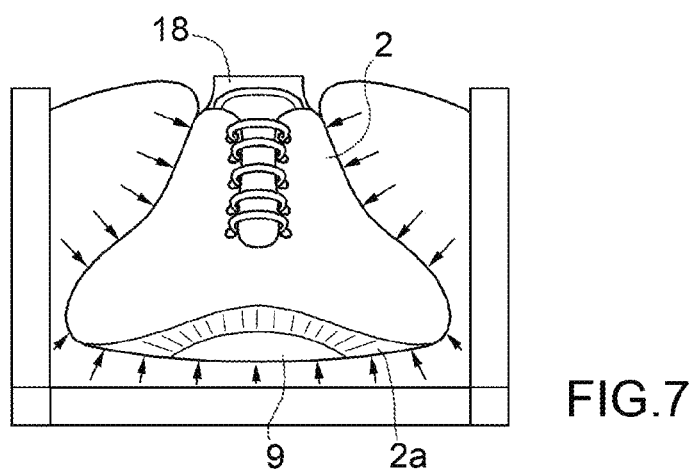
Figure 8:
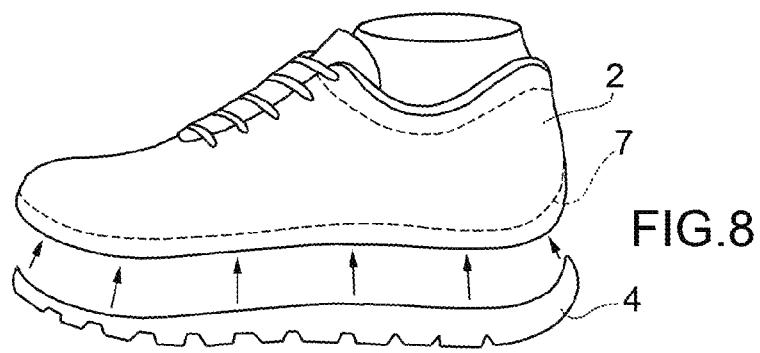

The method further comprises the step of exerting pressure on the entire outer surface of upper 2 so as to compress it onto, make it adhere to the underlying lining 3, and the step of exerting superficial pressure on flap 2*a* of upper 2 so as to cause it to adhere to the underlying flap 7*a* of the functional layer 7 (FIG. 7). These two pressing operations could be executed conveniently in a single operating step by way of a press structured to exert superficial pressure simultaneously on all sides of shape 18. Preferably, three-dimensional superficial pressure may be carried out, for example, by way of a "press machine for soles opanka type" (macchina pressatrice a lavatrice), generally used in shoe manufacturing lines, which is structured to compress both the entire outer face of upper 2 and the functional sheet 9 of insole 5. Thereby, it is possible to ensure, complete and strengthen: fixing the functional layer 7 to sheet 9, fitting the inner surface of upper 2 to the outer surface of the functional layer 7 of lining 3, and attaching flap 2*a* to flap 7*a* thus conveniently obtaining perfect adherence therebetween (FIG. 7). The Applicant has found that it is possible to execute complex attaching of the type described above, by way of the pressing operation generally used in production methods/plants known for fixing the sole, thereby obtaining an economic advantage.

The Applicant has found that the execution of hot pressing on flap 7 and of successive pressure exerted directly on insole 5 (FIG. 7) allows flap 7*a* to be effectively sealed to the functional layer 7 of the functional sheet 9. Indeed, on one hand the hot pressure exerted on flap 7*a* allows the adhesive material (which reticulates) to be effectively reactivated and on the other, the pressure exerted directly on insole 5 allows any folds and pleats on previously thinned flap 2*a* of upper 2 to be smoothed/flattened/eliminated so as to cause the surfaces to adhere perfectly and thus create a single seal. The Applicant has also found that by exerting indirect pressure on insole 5, for example by means of interposing the sole during the assembly thereof, folds and pleats disadvantageously remain in flap 7*a* or 2*a* which then determine the infiltration of water into the shoe, and hence, as demonstrated by the state of the art, require a second seal/gasket.

It is understood that a second different embodiment of the pressing described above could be exerted in two separate steps, one of which, for example the first, involves exerting superficial pressure on flap 2*a* of upper 2 so as to cause the upper surface of flap 7*a* to adhere to the bottom contact surface of the functional sheet 9. A second step may instead involve pressing the entire outer surface of upper 2 so as to compress it onto, and make it adhere to the underlying lining 3.

According to a possible embodiment, the adhesive used to couple lining 3 to upper 2 may be a dotted thermo-adhesive glue, and the three-dimensional pressing described above may be conveniently "hot"-made so as to ensure that the adhesive dots of the adhesive melt so as to couple upper 2 to the functional layer 7.

The method further comprises the steps of covering the free bottom surface of the functional sheet 9 and flap 2*a* by means of the filler layer 11, and of coupling sole 4 to flap 2*a* by interposing preferably, but not necessarily, the protective insert 12 between the upper middle perforated surface of sole 4 and the filler layer 11. In particular, in this step it is possible to couple the peripheral edge of sole 4 to flap 2a of upper 2 by way of the adhesive material 8.

The method described above is extremely advantageous because it involves executing simple, fast operations by way of devices/components/machines used generally in traditional companies for manufacturing shoes and therefore allows costs to be reduced for manufacturing vapor-permeable and waterproof shoes.

Figure 9:
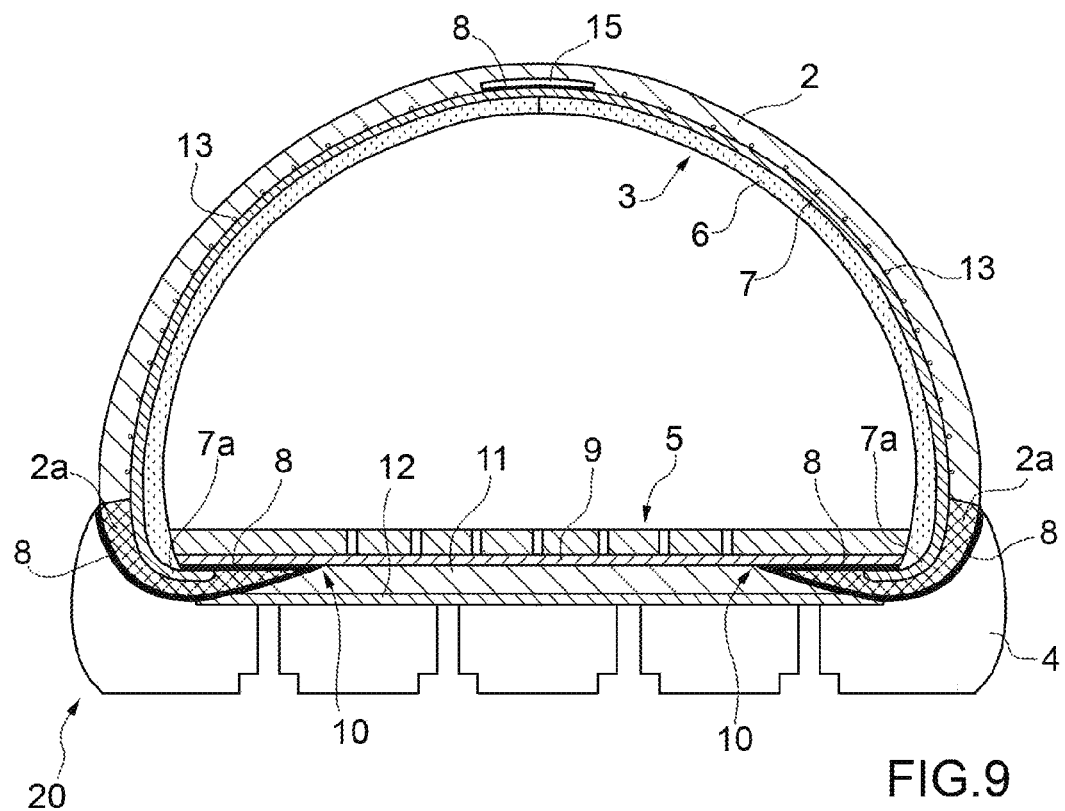

In particular, due to the pressure exerted directly on the insole against the plant of the three-dimensional shape, any pleats and/or folds on the edge of the upper are smoothed, in particular on the toe and on the heel, thereby guaranteeing the efficacy of the single seal and hence eliminating the need to use a second additional seal arranged above the first seal, as instead in the teaching of the state of the art. In this case, pressure in known solutions is not exerted on the insole but on the sole and is therefore ineffective for smoothing the folds in the upper. The embodiment illustrated in FIG. 9 relates to a shoe 20, which is similar to shoe 1, and the forming parts of which will be marked, when possible, with the same numbers marking corresponding parts of shoe 1. Shoe 20 differs from shoe 1 because flap 2a of upper 2 is made by means of a waterproof material, and is shaped so as to extend both beyond the covering layer 6 and flap 7a of the functional layer 7, so that, once folded back internally, it may be arranged in contact with/resting on the functional sheet 9. In particular, the outer surface of flap 7a of the functional layer 7 is glued onto the inner surface of flap 2a of upper 2 so as to be covered completely thereby. Flap 2a further extends internally past the end of flap 7a, so that an end portion thereof is secured to the bottom surface of the functional sheet 9 so as to form the waterproof seal 10.

The method for manufacturing shoe 20 differs from the method for manufacturing shoe 1 because it allows: that the functional layer 7 be conveniently preassembled to upper 2 so as to have its flap 7a secured/glued to the inner surface of flap 2a, that the preassembled upper-lining then be fitted in shape 18, that the waterproof flap 2a be folded and glued as described above, directly on the bottom surface of the functional sheet 9. Thereby, the method is simplified because the step of folding and gluing flap 7a is eliminated. Indeed, a single operation of closing upper 2 is sufficient to also make the waterproof seal 10 between flap 2a and the functional layer 9 of insole 5. Furthermore, the waterproofness is guaranteed of shoes provided with uppers with a structure with many seams. The presence of waterproof flap 2a secured above flap 7a and to the functional sheet 9 creates the waterproof seal 10 which prevents the water which could pass through the seams, from penetrating inside shoe 1. The waterproof flap 2a further conveniently prevents the water entering through the holes of sole 4 to impregnate upper 2 by absorption if the remaining material thereof is not waterproof.

Figure 10:
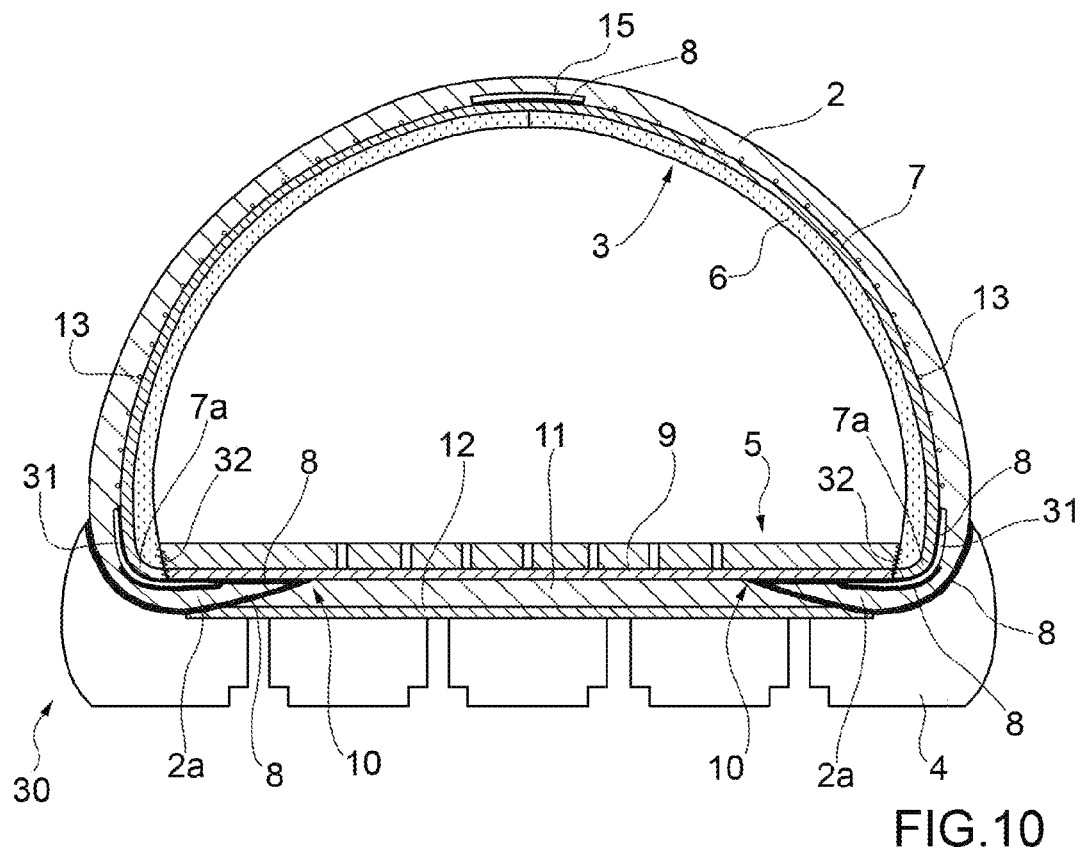

The embodiment illustrated in FIG. 10 relates to a shoe 30, which is similar to shoe 1, and the forming parts of which will be marked, when possible, with the same numbers marking corresponding parts of shoe 1.

In particular, shoe 30 differs from shoe 1 because the flap end of the functional layer 7 is substantially aligned against the lower edge of the covering layer 6, that is does not extend beyond it, and is arranged in contact with, against, the outer peripheral edge of sheet 9 of insole 5 to which it is coupled by way of one or more seams 32, for example according to the so-called "Strobel" technique.

Shoe 30 further differs from shoe 1 because it comprises at least one tape or strip 31 of waterproof material glued above the stitching line 32 between the functional layer 7 and sheet 9 by way of the adhesive material 8 so as to form the waterproof seal 10. With regards to flap 2a of upper 2, it is folded back so as to completely cover strip 31. The terminal part of flap 7 is glued to the bottom surface of the functional sheet 9 by way of the adhesive material 8.

The method for manufacturing shoe 30 differs from the method for manufacturing shoe 1 because in the initial step, it does not involve arranging insole 5 on plant 18a of shape 18 and of fitting assembly 15 on shape 18, but involves arranging an assembly 15 which in addition to lining 3 and the outer upper 2 (coupled reciprocally as shown in FIG. 3), also comprises the edge of insole 5 coupled to the peripheral edge of the functional layer 7 by way of a seam 32. The method further comprises gluing strip 31 to straddle the junction line/seam 32 between the functional layer 7 and the functional sheet 9 by way of the adhesive material 8 so as to form the peripheral waterproof seal 10, and of hot pressing strip 31 so as to complete the securing thereof. In particular, the waterproofing strip 31 is applied on assembly 15, before inserting the latter into shape 18, by way of a specific hot taping machine, which by heating the adhesive already provided on the inner side of strip 31 and simultaneously pressing strip 31 straddling junction/seam 32, automatically seals it.

The method for manufacturing shoe 30 further differs from the method for manufacturing shoe 1 because once assembly 15 is prepared, it allows inserting the latter into shape 18, folding back internally the protruding flap 2a of upper 2 above strip 31 and gluing it, by way of the adhesive material 8, to strip 31 and to the bottom surface of the functional sheet 9. It is worth noting that such gluing could conveniently not be waterproofing, because strip 31 in itself waterproofs the contact/junction points between layer 7 and the functional sheet 9.

The remaining steps of the method for manufacturing shoe 30 correspond substantially to the operations of the method for manufacturing shoe 1 indicated above and accordingly will not be described.

This method is particularly advantageous because it simplifies the steps involved successively after the engagement in the shape of the assembly provided with waterproof sock already formed.

Figure 11:
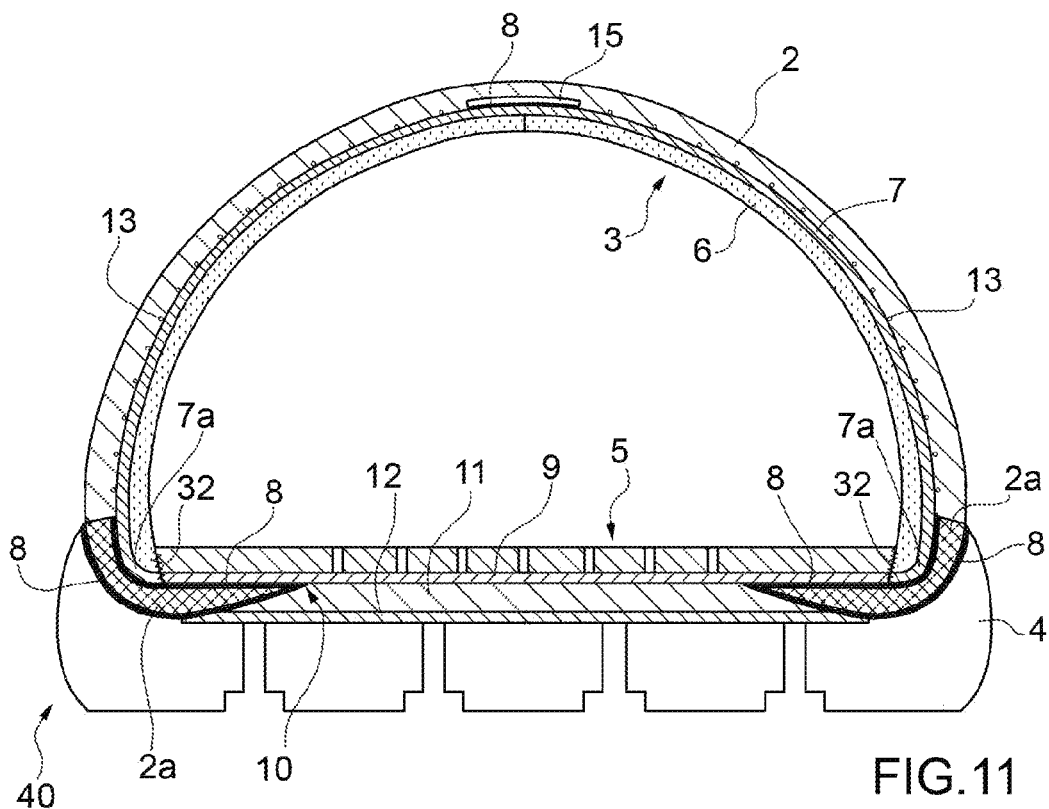

The embodiment illustrated in FIG. 11 relates to a shoe 40, which is similar to shoe 30, and the forming parts of which will be marked, when possible, with the same numbers marking corresponding parts of shoe 30. In particular, shoe 40 differs from shoe 30 because it does not have strip 31, while flap 2a of upper 2 is made of waterproof material and is shaped so as to extend straddling the junction line/seam 32 between the functional sheet 9 and the functional layer 7.

The method for manufacturing shoe 40 further differs from the method for manufacturing shoe 30 because once assembly 15 is provided, the latter is fitted into shape 18, and the following is envisaged: gluing the waterproof flap 2a straddling the junction line of the functional layer 7 and of the functional sheet 9 by way of the adhesive material 8 so as to form the peripheral waterproof seal 10, hot pressing flap 2a so as to complete the securing thereof and ensure the waterproofing of the junction line so as to obtain the waterproof and vapor-permeable sock.

The successive steps of the method for manufacturing shoe 40 are the same as those for the method for manufacturing shoe 30 and accordingly will not be described. This embodiment is particularly advantageous because seal 10, obtained by way of the adhesion of flap 2a and the functional layer 9, makes the shoe completely waterproof, also against the infiltration of water which could penetrate through the holes of sole 4. The water present in the treading surface indeed may not impregnate and travel back up the flaps of upper 2 as they are made of waterproof material.

Figure 12:
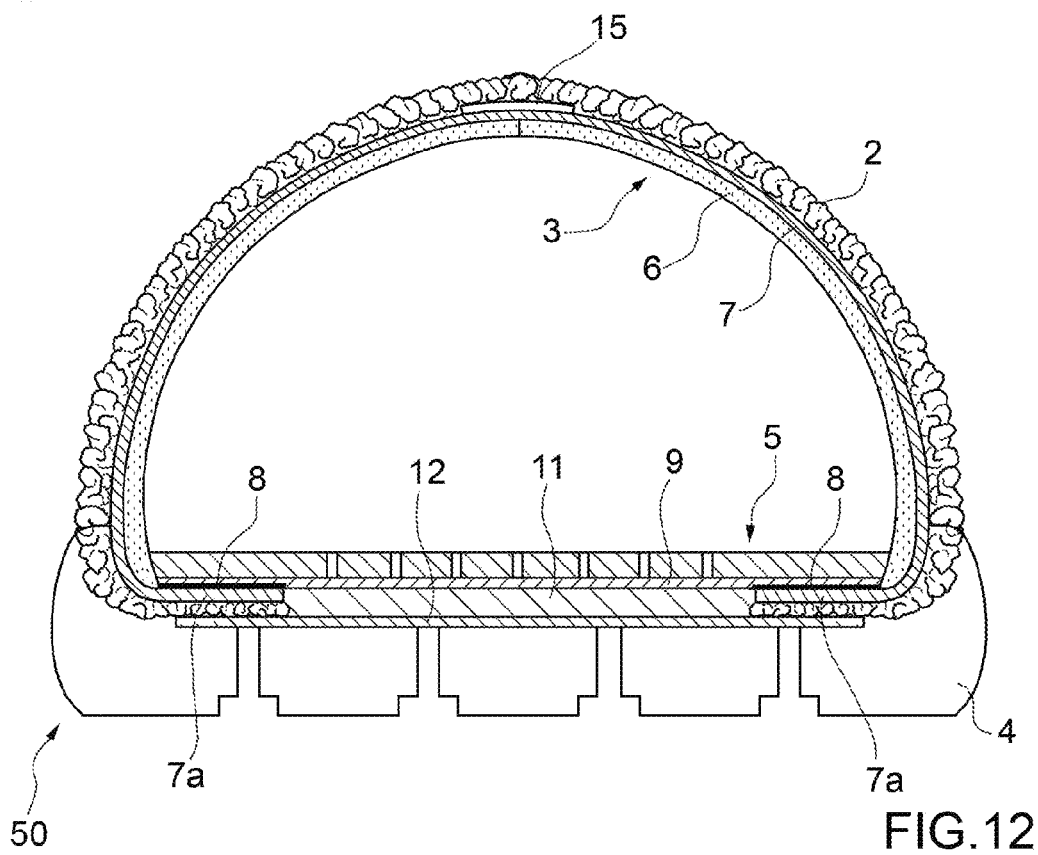

The embodiment illustrated in FIG. 12 relates to a shoe 50, which is similar to shoe 1, and the forming parts of which will be marked, when possible, with the same numbers marking corresponding parts of shoe 1. In particular, shoe 50 differs from shoe 1 because upper 2 has a vapor-permeable mesh/net structure or any similar material completely impregnable by the adhesive and/or the plastic material in the liquid or semi-liquid state injected into the sole during the injection process.

The method for manufacturing shoe 50 differs from the method for manufacturing shoe 1 because sole 4 of waterproof and vapor-permeable material is over-injected onto upper 2 and onto the functional sheet 9, or onto the layers beneath sole 4, so as to cover the functional sheet 9 and flap 2a of upper 2. In particular, sole 4 is over-injected so that the outer peripheral edge thereof surrounds and completely covers the flap 2a folded back of upper 2 thus creating the waterproof seal 10 between the sole and the functional layer 7. Alternatively, the areas of upper 2 on which the pre-molded sole 4 is applied may be impregnated with a layer of waterproof glue. The remaining steps of the method for manufacturing shoe 50 are the same as those for the method for manufacturing shoe 1 and accordingly will not be described.

This embodiment is particularly advantageous because it allows a waterproof and vapor-permeable shoe to be obtained by way of the simple application of sole 4 or with the over-molding thereof. Indeed, the assembly operation (closure of the upper-lining-insole bag) determines the complete waterproofing of the shoe due to the successive seal obtained automatically with the application of sole 4 which also seals flap 2a of upper 2.

Lastly, it is clear that modifications and variants may be made to the above-described and illustrated shoe and method without departing from the scope of the present invention defined by the appended claims.

The invention claimed is:

1. A waterproof and vapor-permeable shoe comprising:
an upper comprising a lower peripheral flap made of waterproof material;
a lining comprising a covering layer made of vapor-permeable material and a functional layer made of vapor-permeable and waterproof material, said functional layer comprising a lower peripheral flap,
said lower peripheral flap of the upper being shaped so as to extend both beyond the covering layer and the lower peripheral flap of the functional layer,
the functional layer of the lining being preassembled to said upper such that the lower peripheral flap of the functional layer of the lining is glued to an inner surface of the lower peripheral flap of said upper by a waterproof adhesive material,
said lower peripheral flap of the upper protruding from said lower peripheral flap of said functional layer of the lining;
the shoe further comprising an insole comprising a functional support sheet made of waterproof and vapor-permeable material,
the lower peripheral flap of the upper being folded back on a bottom surface of the functional support sheet and attached to the functional support sheet by way of the waterproof adhesive material in order to form a single waterproof seal,
wherein the waterproof adhesive material is disposed both above and below the lower peripheral flap of the upper.

2. The waterproof and vapor-permeable shoe according to claim 1, wherein an outer surface of the lower peripheral flap of the functional layer of the lining is glued onto the inner surface of the lower peripheral flap of said upper so that the outer surface of the lower peripheral flap of the functional layer is completely covered by the inner surface of the lower peripheral flap of the upper.

3. The waterproof and vapor-permeable shoe according to claim 1, wherein said lower peripheral flap of the upper further extends internally past an end of the lower peripheral flap of the functional layer of the lining, so that an end portion of the lower peripheral flap of the upper is secured to the bottom surface of the functional sheet so as to form the waterproof seal.

4. The waterproof and vapor-permeable shoe according to claim 1, wherein said waterproof adhesive material comprises a hydrolysis-resistant glue that is activated by a hot pressing.

5. The waterproof and vapor-permeable shoe according to claim 1, wherein said covering layer of the lining is provided with a lower peripheral edge shaped so as to be placed in contact with a peripheral edge of said insole so as not to interpose between said lower peripheral flap of the functional layer of the lining and said functional support sheet of the insole.

6. The waterproof and vapor-permeable shoe according to claim 1, wherein the thickness of said functional layer and/or of the functional sheet is between about 20 microns and about 800 microns.

7. The waterproof and vapor-permeable shoe according to claim 1, wherein the functional layer and/or the functional support sheet comprise one or more expanded polytetrafluoroethylene (e-PTFE) films coupled to at least one layer selected from a group consisting of one or more films and/or protective layers of porous polyurethane, one or more films and/or protective layers of polyester, and combinations thereof, such as to form a multilayer structure.

8. The waterproof and vapor-permeable shoe according to claim 1, wherein the functional layer and/or the functional support sheet comprise a single layer of extruded expanded polytetrafluorethylene (e-PTFE).

9. The waterproof and vapor-permeable shoe according to claim 1, wherein the lower peripheral flap of said functional layer protrudes from a peripheral edge of said covering layer.

* * * * *